Aug. 3, 1943. A. LYSHOLM 2,325,618
MOTIVE FLUID FOR PRIME MOVERS
Filed Oct. 1, 1940
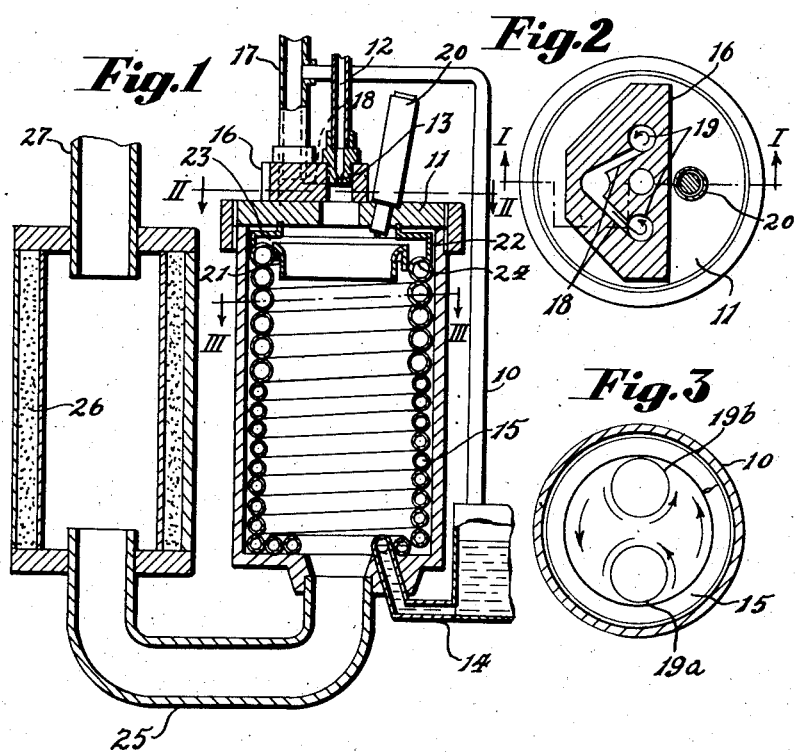
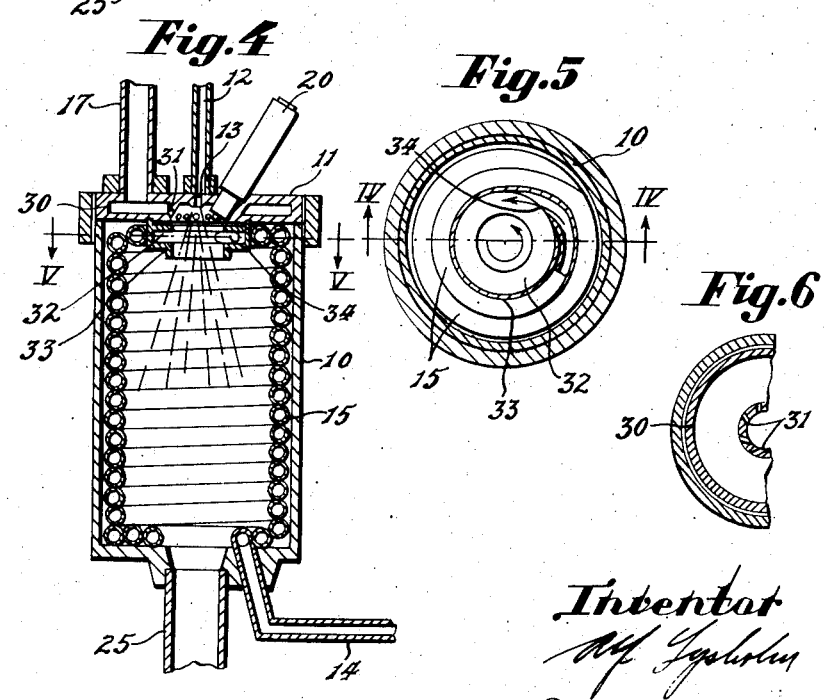

Patented Aug. 3, 1943

2,325,618

UNITED STATES PATENT OFFICE 2,325,618

MOTIVE FLUID FOR PRIME MOVERS

Alf Lysholm, Stockholm, Sweden

Application October 1, 1940, Serial No. 359,204
In Sweden October 3, 1939

13 Claims. (Cl. 60—45)

This invention relates to methods of and apparatus for producing a motive fluid for prime movers, such as internal combustion engines or turbines for torpedoes, submarines, rocket propulsion or the like and particularly to apparatus of the type wherein the motive fluid is produced in the presence of an oxygen-carrying liquid such as hydrogen peroxide.

The object of this invention is primarily to ensure a maximum amount of motive fluid for a given amount of oxygen available for combustion as well as to produce reliable operation of the apparatus. A further object of the invention is to provide an apparatus having relatively small dimensions for producing large quantities of motive fluid.

According to the present invention the method of producing motive fluid includes the steps of supplying heat to an oxygen-carrying liquid for producing oxygen containing gas, separating gas and liquid from one another and burning fuel by means of said gas.

According to a further feature of the invention the method of producing motive fluid includes the steps of supplying heat to an oxygen-carrying liquid contained in a conduit so as to produce oxygen-containing gas, supplying said liquid and gas to a combustion chamber, separating liquid from the gas in said chamber and burning fuel by means of said gas in said chamber.

The apparatus according to the invention comprises a combustion chamber having its wall wholly or in part formed of a double-walled jacket preferably in the form of a pipe coil through which oxygen carrying liquid is supplied to said chamber in the form of a mixture of oxygen containing gas and said liquid.

The invention will be hereinafter more fully described with reference to the embodiments illustrated by way of example in the accompanying drawing, in which:

Fig. 1 shows a section taken in part on the line I—I of Fig. 2 through an apparatus for producing driving fluid according to the invention;

Fig. 2 shows a section on the line II—II of Fig. 1;

Fig. 3 shows a section on the line III—III of Fig. 1;

Fig. 4 shows a combustion chamber according to a further embodiment of the invention; and a section on the line IV—IV of Fig. 5;

Fig. 5 is a section on the line V—V of Fig. 4 and

Fig. 6 is a fragmentary section showing a port arrangement in Fig. 4.

Referring to the drawing, 10 denotes the exterior wall of a combustion chamber which may be of substantially cylindrical form and which at one end is closed by a cover 11. Fuel is admitted to the combustion chamber through a conduit 12 and a nozzle 13 which opens preferably centrally of the cover 11, and the axis of which is substantially parallel to that of the cylindrical combustion chamber.

An oxygen containing liquid, such as hydrogen peroxide, is supplied to the chamber 10 through a conduit 14 at the opposite (lower) end of the chamber relatively to the nozzle 13. Within the combustion chamber the oxygen carrier flows through a helical pipe coil 15 of cylindrical forming which is located adjacent the exterior wall 10 and the individual coils of which may be in contact with each other. The diameter of the pipe 15 may be greater at the upper than at the lower end thereof.

In the embodiment shown in Figs. 1–3 the nozzle 13 is mounted on a member 16 secured to the cover 11. Air from a pressure source is supplied to the combustion chamber through a conduit 17 secured to the member 16. Channels 18 extend from the conduit 17 in the member 16 in a plane perpendicular to the axis of the combustion chamber to axial bores 19 in the member 16 and the cover 11. The channels 18 open tangentially into the bores 19 so that the air passing from the channels receives a rotating movement in one and the same direction in the two bores. The bores 19 are located laterally of the nozzle 13, preferably on opposite sides thereof. An ignition plug 20 is provided in the cover 11.

In the embodiment shown in Figs. 1–3, a collar 21 is provided in the upper part of the combustion chamber and bears against the inner periphery of the coil 15. An angularly bent collar 22 extends from the outer periphery of the coil to the cover 11 and is separated from the collar 21 so as to form an annular space 23. The upper part of pipe coil 15 has a number of apertures 24 opening into the space 23.

A conduit 25 extends from the bottom of the combustion chamber to a chamber 26 which is preferably provided with walls of heat-insulating material. Said chamber is connected through a conduit 27 with the prime mover to be supplied with motive fluid.

The operation of the device is as follows. On starting fuel is supplied to the combustion chamber through the nozzle 13 and air through the conduit 17. The fuel is ignited by the plug 20. Due to the form of the channels 18 and 19 the air enters the combustion chamber in two zones 19a and 19b in which the air rotates in the direction indicated by the arrows in Fig. 3. Owing to the combustion of the fuel the coil 15 is heated. The oxygen carrying liquid flowing therethrough is thus heated so that gaseous oxygen or oxygen containing gas is formed in the coil, firstly in the upper portion thereof which is exposed to the highest temperature.

Gas and liquid leave the openings 24 at the upper side of the coil at a high velocity and in a direction more or less tangential to the space 23. The rotational flow of gaseous oxygen and liquid continue through the inner collar 21 into the combustion chamber. Due to centrifugal force part of the liquid is thrown outwardly against the coil 15 and flows downwardly over its inner surface. The oxygen gas is mixed with the fuel and assists in producing an intense combustion of the same. In the upper part of the combustion chamber there is thus formed according to the invention an ignition zone in which the fuel is burned at a very high temperature.

The temperature of the gases in the upper combustion zone is too high to be supplied direct to the prime mover. The gases therefore are cooled by delivering heat to the oxygen carrier within the coil 15 as well as to the liquid flowing downwardly along the inner side of the coil. The liquid in the interior of the combustion chamber is thus vaporised. The combustion gases are further cooled in the chamber 26 into which liquid particles may be carried by the gas stream through the conduit 25. As will be seen from the aforesaid the flow of gases within the combustion chamber and the flow of the oxygen carrier within the coil 15 is effected according to the counterflow principle.

The embodiment shown in Figs. 4 and 5 differs from that previously described mainly by the fact that the air supply pipe 17 is connected to an annular chamber 30 in the cover 11 which chamber is in communication with the combustion chamber through a plurality of more or less tangentially extending channels 31 disposed around the nozzle 13. The air thus enters the combustion chamber in a rotating or whirling movement. The coil 15 opens tangentially as at 34 in an annular space 32 formed by an annular member 33 having an upper or outer opening which is in alignment with the nozzle 13 and the axis of the cylindrical combustion chamber. The air discharging through the channels 31 and the oxygen carrying liquid together with the oxygen gas receive a rotational flow in one and the same direction within the combustion chamber so as to ensure separation of the liquid in the upper combustion zone. The operation of the apparatus according to Figs. 4 and 5 is otherwise the same as that described with relation to Figs. 1–3.

In the embodiment shown in Figs. 1–3 the supply of oxygen-carrying liquid is effected by the pressure of the compressed air fed into the combustion chamber. In the embodiment shown in Figs. 4 and 5 the oxygen-carrying liquid is supplied by means of a separate pump.

The hydrogen peroxide is preferably highly concentrated, for instance, up to 30% or 40%. Any fuel suitable for the purpose may be used, such as alcohol, gasoline, petroleum, or other fractions of petroleum oils.

What I claim is:

1. A method of producing motive fluid for prime movers, particularly adapted for use with prime movers of torpedoes, which includes the steps of heating an oxygen carrying liquid to vaporize a portion thereof and to produce an oxygen containing gas, separating the gas thus produced from the remaining liquid, burning fuel by means of said gas and directly utilizing a portion of the heat produced by said burning to heat said oxygen carrying liquid.

2. A method of producing motive fluid for engines such as engines adapted to propel torpedoes, which includes the steps of supplying heat to an oxygen carrying liquid contained in a conduit so as to produce oxygen-containing gas, supplying said liquid and gas to a combustion chamber, separating liquid from the gas in said chamber and burning fuel by means of said gas in said chamber.

3. A method according to claim 2, in which the mixture of oxygen carrying liquid and gas is supplied to the combustion chamber in the form of a rotating or whirling stream in order to separate the liquid out of the combustion or flame zone of the combustion chamber.

4. A method according to claim 2 which includes the step of supplying air in addition to the combustion chamber in a rotating or whirling stream more particularly when starting the combustion.

5. A method according to claim 2, in which the oxygen carrier passes through a conduit which forms part of the wall of the combustion chamber in counter-current relatively to the flow of hot gases through the combustion chamber.

6. A method according to claim 2, in which the combustion products are cooled by the liquid separated from the oxygen-containing gas in the combustion zone of the combustion chamber.

7. A method according to claim 2 characterized by the fact that the oxygen carrying liquid consists of hydrogen peroxide having a concentration of more than 30%.

8. Apparatus for producing motive fluid for prime movers such as for propelling means for torpedoes which comprises means providing a combustion chamber having its walls formed at least in part by a jacket, means for supplying an oxygen-carrying liquid to said chamber through said jacket in the form of a mixture of oxygen-containing gas and said liquid and means for introducing said mixture into said chamber so as to cause a separation of the gaseous and liquid constituents thereof within the chamber.

9. Apparatus according to claim 8 in which the jacket is in the form of a pipe coil.

10. Apparatus according to claim 8 in which the jacket is in the form of a pipe coil, the diameter of the pipe of which is greater at the outlet end than at the inlet end thereof.

11. Apparatus according to claim 8, in which the jacket communicates with a space in which a rotating or whirling action is imparted to the mixture.

12. Apparatus for producing motive fluid for prime movers such as for propelling means for torpedoes which comprises means providing a combustion chamber having its walls formed at least in part by a jacket through which oxygen-carrying liquid is supplied to the chamber in the form of a mixture of oxygen-containing gas and said liquid, means providing an annular space with which said jacket communicates, means for imparting a rotating or whirling motion to the mixture delivered to said space from said jacket and a fuel supply nozzle delivering fuel through the core of said annular space.

13. Apparatus according to claim 8, in which the gas discharges from the combustion chamber into a further chamber for completing the cooling of the motive fluid by liquid to be vaporized.

ALF LYSHOLM.